(12) United States Patent
Chee et al.

(10) Patent No.: US 10,567,850 B2
(45) Date of Patent: Feb. 18, 2020

(54) HIERARCHICAL VIDEO CONCEPT TAGGING AND INDEXING SYSTEM FOR LEARNING CONTENT ORCHESTRATION

(71) Applicant: INTERNATIONAL BUSINESS MACHINES CORPORATION, Armonk, NY (US)

(72) Inventors: Yi-Min Chee, Yorktown Heights, NY (US); Ashish Jagmohan, Irvington, NY (US); Ravindranath Kokku, Yorktown Heights, NY (US); Rong Liu, Sterling, VA (US); Satyanarayana V. Nitta, Cross River, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 6 days.

(21) Appl. No.: 15/249,093

(22) Filed: Aug. 26, 2016

(65) Prior Publication Data
US 2018/0063601 A1   Mar. 1, 2018

(51) Int. Cl.
*H04N 21/84* (2011.01)
*H04N 21/61* (2011.01)
*H04N 21/482* (2011.01)
*H04N 21/845* (2011.01)
*H04N 21/25* (2011.01)
(Continued)

(52) U.S. Cl.
CPC ......... *H04N 21/84* (2013.01); *G06F 16/7867* (2019.01); *H04N 21/23418* (2013.01); *H04N 21/252* (2013.01); *H04N 21/25891* (2013.01); *H04N 21/26603* (2013.01); *H04N 21/278* (2013.01); *H04N 21/4394* (2013.01);
(Continued)

(58) Field of Classification Search
CPC ................ H04N 21/84; H04N 21/252; H04N 21/25891; H04N 21/4532; H04N 21/4667; H04N 21/4788; H04N 21/4828; H04N 21/6125; H04N 21/845; H04N 21/23418;
(Continued)

(56) References Cited

U.S. PATENT DOCUMENTS

6,434,520 B1    8/2002   Kanevsky et al.
6,847,980 B1 *  1/2005   Benitez ................... G06F 16/71
                                                          707/741
(Continued)

*Primary Examiner* — Pankaj Kumar
*Assistant Examiner* — Alexander Boyd
(74) *Attorney, Agent, or Firm* — Intelletek Law Group, PLLC; Gabriel Daniel, Esq.

(57) ABSTRACT

A computer system, method, and computer-readable product for automatically generating a hierarchy of concepts described in a video using semantic concept matching that assists persons in searching for specific types of content within videos. A video segment is obtained, with the segment having a distinct running time with discrete information related to one or more topics within its content. The discrete information of the video segment is then parsed out and related to a predetermined relevant topic, and then one or more attributes for weighting each discrete information relevant topic within the video segment are determined. A hierarchy of concepts of the video segments is then created, based upon, at least, the weighting of the information topic within the running time of the video segment based upon the presence of the one or more attributes. Other information related to the video segment can also be used to modify the hierarchy.

20 Claims, 4 Drawing Sheets

(51) Int. Cl.
  *H04N 21/466* (2011.01)
  *H04N 21/258* (2011.01)
  *H04N 21/45* (2011.01)
  *G06F 16/78* (2019.01)
  *H04N 21/234* (2011.01)
  *H04N 21/266* (2011.01)
  *H04N 21/439* (2011.01)
  *H04N 21/44* (2011.01)
  *H04N 21/278* (2011.01)

(52) U.S. Cl.
  CPC ... *H04N 21/44008* (2013.01); *H04N 21/4532* (2013.01); *H04N 21/4667* (2013.01); *H04N 21/4828* (2013.01); *H04N 21/6125* (2013.01); *H04N 21/845* (2013.01)

(58) Field of Classification Search
  CPC ......... H04N 21/26603; H04N 21/4394; H04N 21/44008; H04N 21/278; G06F 17/3082
  See application file for complete search history.

(56) References Cited

U.S. PATENT DOCUMENTS

| | | | |
|---|---|---|---|
| 7,143,434 B1* | 11/2006 | Paek | G06K 9/00711 725/142 |
| 8,452,778 B1* | 5/2013 | Song | G06K 9/00711 704/233 |
| 8,488,839 B2* | 7/2013 | Sharon | G06T 7/246 382/103 |
| 8,886,655 B1* | 11/2014 | Nandy | G06F 16/904 707/749 |
| 8,914,452 B2 | 12/2014 | Boston et al. | |
| 8,972,840 B2 | 3/2015 | Karas et al. | |
| 9,087,297 B1* | 7/2015 | Filippova | G06F 16/70 |
| 9,602,559 B1* | 3/2017 | Barros | H04L 65/403 |
| 2002/0092031 A1* | 7/2002 | Dudkiewicz | H04N 21/8405 725/138 |
| 2009/0048833 A1 | 2/2009 | Fritsch et al. | |
| 2010/0121973 A1 | 5/2010 | Lobacheva et al. | |
| 2012/0078626 A1* | 3/2012 | Tsai | H04N 21/4884 704/235 |
| 2013/0136416 A1* | 5/2013 | Sathish | H04N 21/47202 386/239 |
| 2014/0324864 A1* | 10/2014 | Choe | G06F 17/30823 707/737 |
| 2015/0055931 A1* | 2/2015 | Koivukangas | H04N 21/2743 386/228 |
| 2015/0154956 A1 | 6/2015 | Brown | |
| 2016/0163311 A1* | 6/2016 | Crook | G10L 15/1815 704/275 |
| 2016/0171381 A1* | 6/2016 | Brewer | H04N 21/251 706/11 |
| 2017/0344617 A1* | 11/2017 | Sen | G06F 16/313 |

* cited by examiner

HIERARCHICAL VIDEO CONCEPT TAGGING AND INDEXING SYSTEM FOR LEARNING CONTENT ORCHESTRATION

BACKGROUND

The present disclosure relates to stored video content in an electronic storage media. More specifically, the present disclosure relates to a computerized system and methodology to automatically generate a hierarchy of concepts described in a video using semantic concept matching on the video transcript, including corresponding comments and feedback, seed descriptions, and indexing and weighting of parts and topics of the video for ease of viewing.

The volume of stored video content on both private networks and the public Internet is vastly increasing. Many of the stored videos are specifically for educational purposes. There are many websites that aggregate specific educational videos and make them freely available to the public. A large amount of the stored educational content contains knowledge useful for a broad range of learners, from early childhood all the way to senior citizen learning, as well as corporate and workplace education.

The potential educational material of these videos can widely range in topics, from being purely factual and informative to the teaching and demonstration of actual skills. The taught subject matter can thus range all the way from theory, to specific demonstrative examples such as experiments, to documentary style content on a subject. Because of the wide range of potential stored subject matter for educational videos, it is often difficult to adequately describe the content of the video to tag the video with relevant labels or attributes for categorization and indexing so that a person can more easily find the educational content and experience that they seek.

Currently, categorization and indexing of relevant parts of the videos is mostly done manually and is restricted to the creator's understanding and original description of the content. In many of the general public sites, the videos have very minimal tagging of the content and indexing within videos is missing. Moreover, the same content can be relevant in several other dimensions at a semantic level which would not be discoverable by a searcher. For example, a video tagged as "leadership" may contain leadership-by-examples and success stories, but could also include associated concepts such as communication skills or time management that might be important for a viewer. Also, typically when people speak or lecture, they touch upon multiple concepts in an inter-twined manner. Some concepts may be elaborated very thoroughly while others are only mentioned briefly.

SUMMARY

According to an embodiment of the present disclosure, a system, method, and computer readable product is provided for automatically generating a hierarchy of concepts described in a video using semantic concept matching that assists persons in searching for specific types of content within videos. The present system is useful, in particular, for educational videos where a user may wish to search for educational content of a certain type or style, and existing information about the video content is typically insufficient to provide an adequate searching capability.

To create a hierarchy of concepts that is searchable, a video segment is obtained by the computer system, with the video segment having a distinct running time with discrete information related to one or more topics within its content. Examples of topics can be the nature of the content discussed, style of presentation, and overall nature of the video. The discrete information of the video is then parsed out and related to a predetermined relevant topic, and then one or more attributes are determined for weighting each discrete information topic is within the video segment. A hierarchy of concepts of the video segments is then created, based upon, at least, the weighting of each discrete information topic within the running time of the video segment based upon the presence of the one or more attributes.

The one or more attributes for weighting each discrete information relevant topic can be the duration of the relevant topic within the video segment, the breadth of the relevant topic, the relatedness of the relevant topic to other relevant topics within the video segment, and the developmental pattern of the relevant topic within the video segment. Other relevant attributes can be combinations and weightings of attributes like these.

The hierarchy of concepts provides a better search mechanism for a user attempting to learn of the nature of the content available in the video. The hierarchy can be stored as a weighted graph wherein each of concept is a weighted node within the graph. This allows a higher degree of concept matching for very granular search of video material having specific attributes. The weighted graph for the video segment can be stored with the video segment to be generally searchable, or can be stored elsewhere in a searching database.

The informational data to create the hierarchy of concepts can come from parsing natural language from the video segment, and analyzing the natural language text to create the discrete information. Alternately, or additionally, visual content from the video segment can be parsed and analyzed to create the discrete information. Other data embedded in the video, such as closed captioning data, can likewise be gathered and analyzed.

Other information related to the video segment can also be used to modify the hierarchy. For example, topic tags or seed descriptions created for the video segment by the creator can be gathered, and user comments related to the video segment can be gathered and parsed in similar manner to the discrete information of the video to improve the hierarchy of concepts.

The hierarchy of concepts can then have the topic duration weighting updated with the additional information to be more accurate. If the hierarchy is embodied as a weighted graph, the nodes can have their weighting modified with the additional discrete information.

DETAILED DESCRIPTION

Detailed embodiments of the claimed structures and methods are disclosed herein; however, it can be understood that the disclosed embodiments are merely illustrative of the claimed structures and methods that may be embodied in various forms. The present disclosure may, however, be embodied in many different forms and should not be construed as limited to the exemplary embodiments set forth herein. Rather, these exemplary embodiments are provided so that this disclosure will be thorough and complete and will fully convey the scope of the present disclosure to those skilled in the art. In the description, details of well-known features and techniques may be omitted to avoid unnecessarily obscuring the presented embodiments.

Figure 1:
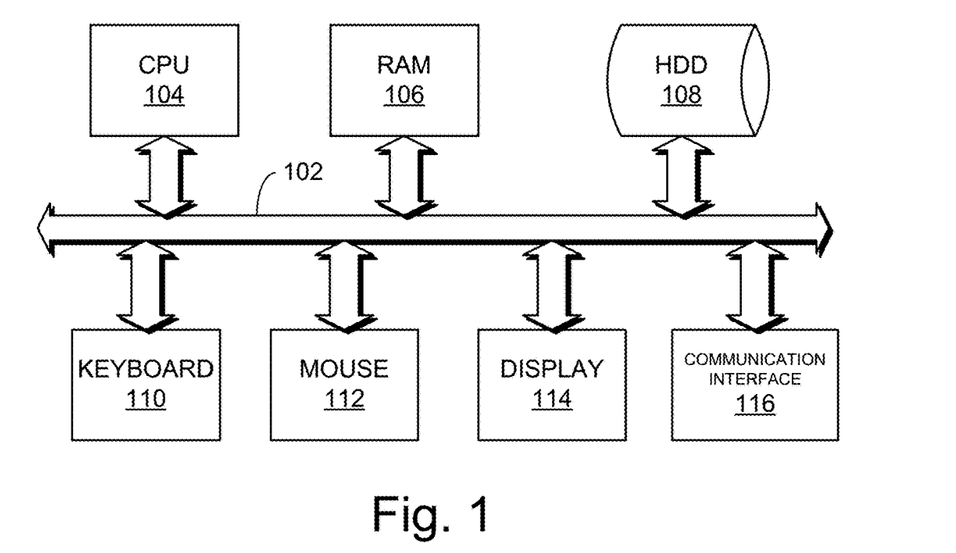
FIG. 1 is a block diagram that shows examples of hardware used according to one embodiment of the present disclosure.

As shown in FIG. 1, a block diagram illustrates computer hardware utilized to realize the system configuration and processing of the present disclosure. CPU (central processing unit) 104, RAM (main memory) 106, HDD (hard disk drive) 108, Keyboard 110, Mouse 112 and Display 114 are connected to a system bus 102. CPU 104, in an embodiment of the present disclosure, is preferably based on a 32-bit or 64-bit architecture. For example, Intel® or Athlon™ chips can all be used. RAM 106, in an embodiment of the present disclosure, normally has a storage capacity of at least 2 GB-4 GB.

In FIG. 1, HDD 108, in an embodiment of the present disclosure, has capabilities that include storing a program that can execute the processes described herein. For example, a program, such as Apache™, can be stored for operating the system as a Web server. HDD 108, in an embodiment of the present disclosure, can store an executing application that includes one or more library software modules, such as those for the Java™ Runtime Environment program for realizing a JVM (Java™ virtual machine).

Figure 2:
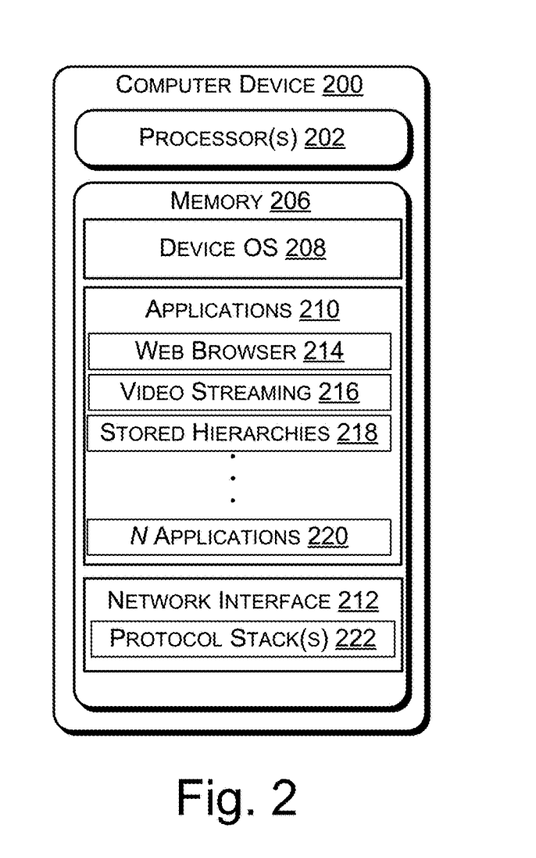
FIG. 2 is a representative diagram of computer components that automatically generate a hierarchy of concepts described in a video using semantic concept matching.

Additionally, in FIG. 1, a Keyboard 110 and Mouse 112 can be used to manipulate graphic objects, such as icons, task bars and text boxes displayed on Display 114 in accordance with the graphic user interface provided by a device operating system (OS) 208 in FIG. 2. Display 114, in FIG. 1, in one embodiment of the present disclosure, is a 32-bit true color LCD monitor with a resolution of at least 1024×768. Display 114 is used, for example, to display the results of operations performed by an application program executed, such as a software application being executed in a JVM.

Communication Interface 116, in FIG. 1, in one embodiment, is connected to a network using the Ethernet® protocol. In the present disclosure, Communication Interface 116 receives processing requests in accordance with a communication protocol, for example TCP/IP, from a another computer (not shown) using functions provided by a program, for example in one embodiment, Apache, and processing results are sent to the another computer (not shown). The communication interface 116 can access the video segments, such as video segment 300 in FIG. 3, across the Internet or a private network.

FIG. 2 illustrates exemplary components of a computer device 200 that can identify and isolate library code executing thereupon. An example of the computer device 200 can be the CPU 104 in FIG. 1. The computer device 200 may include one or more processor(s) 202, and a memory 206 storing a device OS 208, various software applications 210 configured to request/receive data over the network, and a network interface module 212.

In various embodiments, the applications 210 stored at the computer device 200 may include, but are not limited to, a web browser application 214, a video streaming application 216, and stored hierarchies of concepts of video segments 218, and so on, through an Nth software application 220. During execution on the computer device 200, each of the applications 210 may be configured to cause the computer device 200 to initiate data communications with other devices across the network. The video streaming application 216 can be used to access the video segment (Video segment 300 in FIG. 3) to either play the video segment to the user of the computer, or can be used to simply execute the video segment for parsing and creating of the hierarchy of concepts as further described herein.

The computer device 200 may be also configured to communicate over a telecommunications network using any common wireless and/or wired network access technology. Moreover, the computer device 200 may be configured to run any compatible device OS, including but not limited to, Microsoft Windows Mobile®, Google Android®, Apple iOS®, Linux Mobile®, as well as any other common mobile device OS. The resident device OS 208 will have one or more resident diagnostic applications or tools, such as Android Debug Bridge, that can be executed to generated diagnostic information for the computer device 200.

Each of the one or more processor(s) 202 can include one or more central processing units (CPUs) having multiple arithmetic logic units (ALUs) that perform arithmetic and logical operations, as well as one or more control units (CUs) that extract instructions and stored content from processor cache-level memory, and then executes instructions by calling on the ALUs during program execution. In an implementation, the processor(s) 202 may be configured to execute each of the software applications 210 stored in the memory 206. In various embodiments, the network interface module 212 may be configured to detect an action (e.g., operation, command, user input) directed to one of the applications 210, the action triggering the generation of a data transfer request and a transmission of the data transfer request.

The memory 206 may be implemented using computer readable media, such as computer storage media. In various embodiments, the memory 206 may store a virtual computer device. In various embodiments, the multiple layers may also correspond to the Internet Protocol (IP) suite. For example, in various embodiments, the computer device 200 may execute a program on each of a physical layer, a data link/radio layer, a network layer/Internet layer, a transport layer, a session layer, a presentation layer, and an application layer, as a data packet is generated and configured amongst the layers for communication from the computer device 200 to the other computer devices.

Figure 4:
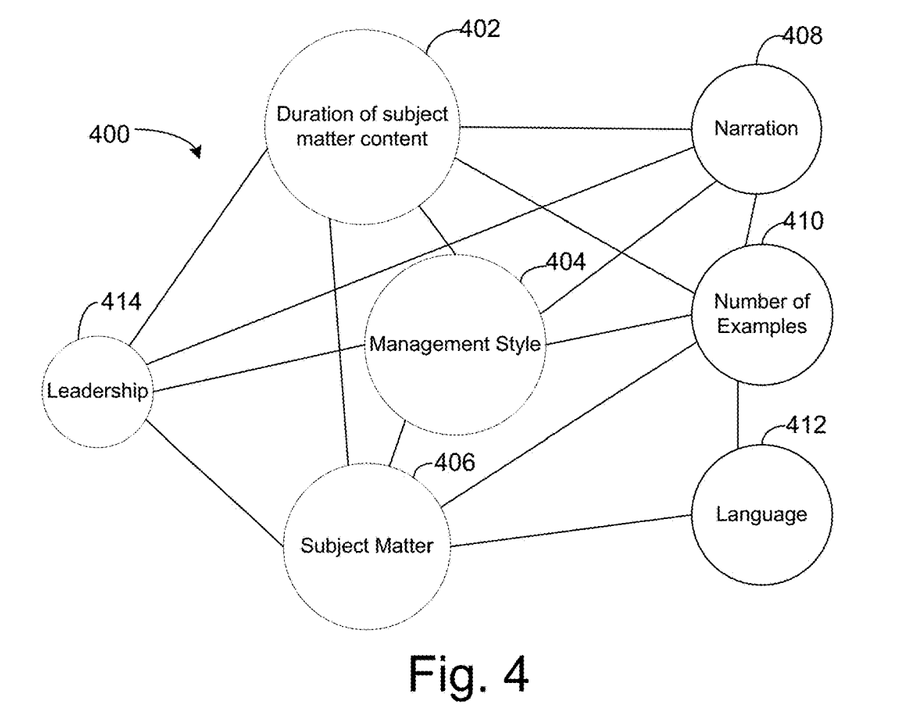
FIG. 4 is a weighted graph of nodes that reflect the hierarchy of concepts contained in a video segment that can be created to be searchable to a user for a more accurate depiction of the nature of the content of a video segment.

Also shown in FIG. 2 is an example of the computer device 200 having local storage of created hierarchies of concepts, such as the weighted graph shown in FIG. 4. Once weighted graphs are created as further described herein, the graphs can then be stored in the stored hierarchies 218 in either temporary or permanent manner. Moreover, the stored hierarchies 218 can also be remotely located and accessible to the computer device 200 and a staged-storage of graphs may be used with more likely used graphs being stored in resident memory 206 while less likely graphs are stored at a remote database, such as database 108 in FIG. 1.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. For example, the computer readable storage medium may be, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA), may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
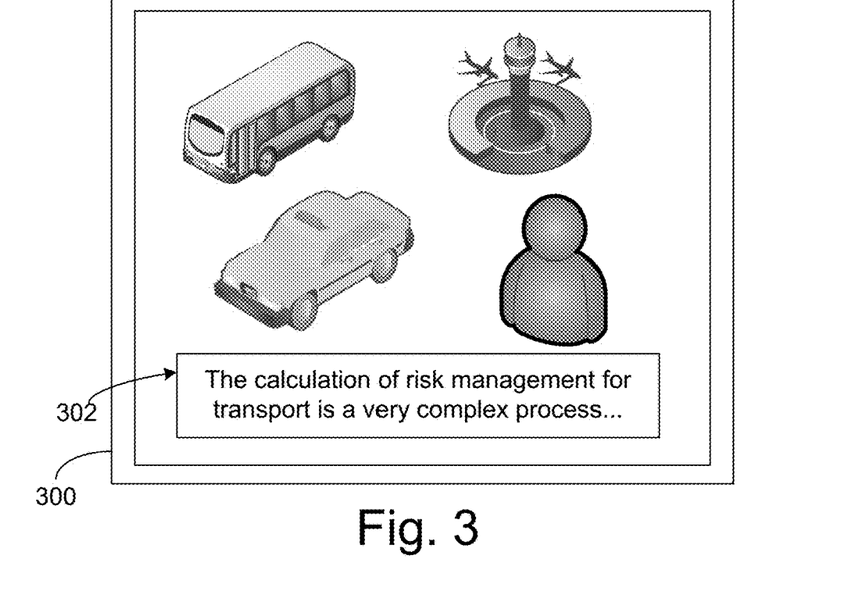
FIG. 3 is a video segment that is shown in its player format, having a speech shown with closed captioning data being contained in the segment and being displayed within the running of the video.

FIG. 3 is a video segment 300 that is executing and displaying to a user, with closed captioning 302 displaying from data embedded in the video segment. In this embodiment, the computer 200 can execute the video segment and parse out the closed captioning data to ascertain the specific topics being discussed within the video segment 300. In such manner, the computer 200 does not require another stored application to convert the spoken language from the video segment 300 into discrete information. Otherwise, the computer 200 can analyze and parse out almost any potential data within the video segment 300 to create a hierarchy of concepts, such as the weighted graph 400 in FIG. 4, for a more optimal search by a person seeking to better understand the content of the video, especially where instruction or learning is shown.

Other data can be taken and parsed from the video segment, such as video content, natural language, user comments, topic tags included by the creator of the video segment, and the like. Any or all of this information can be used in creating the hierarchy of concepts, such as that shown in weighted graph 400 in FIG. 4. Once the discrete information is gathered and applicable topics for the information are generated, the amount of run time for each topic in the video can be calculated.

Thus, in one embodiment, the computer 200 can automatically generate a hierarchy of concepts described in a video segment 300 using semantic concept matching on video transcripts, comments and feedback, seed descriptions, and indexing and weighting parts of the video for ease of viewing. The main attribute that is taken from the video segment 300 to generate the hierarchy of concepts is the run time for each of the topics within the video segment 300.

One of the major descriptors includes the time notion of how long a concept was discussed within the video segment 300. In such manner, the video can be labeled particularly effectively for educational content. For example, a teaching video can be rated: 70% leadership, 20% communication, 10% teamwork. Furthermore, the content mixture can be granularly examined and searched. For example, the content mixture could be described as 80% leadership, 20% collaboration.

Further, the patterns of development within the video segment 300 can be analyzed, such as narration, description, illustration with examples, definition, comparison, classification, causal analysis, argumentation, process analysis, which each attribute assigned a value, such as a node in the weighted graph of FIG. 4. Higher level attributes that still may have relevance can also be parsed, gathered, and analyzed by the computer system 200, such as the intended audience age, gender, geographical location (both where the video is made and where it is viewed), any salient event subject, date, location, season, or even emotions contained within the video segment 300. Additionally, the various subjects can be collectively captured to and related to each other. For example, how many relevant concepts are mentioned: leadership may be related to people management, time management, etc.

FIG. 4 is one embodiment of a weighted graph 400 of nodes that reflect the hierarchy of concepts included in a video segment 300 that can be created, in one embodiment, to be searchable to a user for a more accurate depiction of the nature of the content of a video segment 300. A weighted graph is a directed graph that weights nodes within the graph and can have linkage between nodes that can relate a whole concept. In FIG. 4, various topical concepts are included within each node and weighted within the graph, shown here by size of the node.

For example, in weighted graph 400, there are nodes for duration of subject matter content 402, management style 404, subject matter 406 narration 408, number of examples 410, language 412 and leadership 414. When each of this information is parsed from the video segment 300, it is analyzed by the computer system and put into this weighted graph 400 with a weighting based on its importance. As embodied here, the largest node is the duration of content 402, i.e., how long the subject matter appears within the video segment 300. The subject matter 406 itself can be one item in the weighted graph 400, along with a concept of management style 404. Once the weighted graph 400 is created, it can be stored such as within stored hierarchies 218 in FIG. 2 or at a remote database in FIG. 1, for searching.

Accordingly, all concepts can be weighted such that a searcher can input data seeking various subject matter of learning, and a "searching weighted graph" can be created and compared with stored weighted graphs for isomorphism. Edges of the weighted graph 400 can also be waiting to make a pattern that is emphasized within the graph to increase isomorphism. Isomorphism can be related to both individual nodes and to the relations between them. In graph theory, an isomorphism of two graphs G and H is a bijection between the vertex sets of G and H, f: $V(G) \rightarrow V(H)$ such that any two vertices u and v of G are adjacent in G if and only if f(u) and f(v) are adjacent in H. Consequently, in FIG. 4, the concepts and level of importance can be searched specifically on the topic of each node and their relationship will allow a semantic search. For example, the user can search for a video that is mostly about managing environmental assets (duration of subject matter 402), for supervisors in a government entity (leadership 414 and management style 404), that show practical examples from existing government entities (number of examples 410).

Figure 5A:
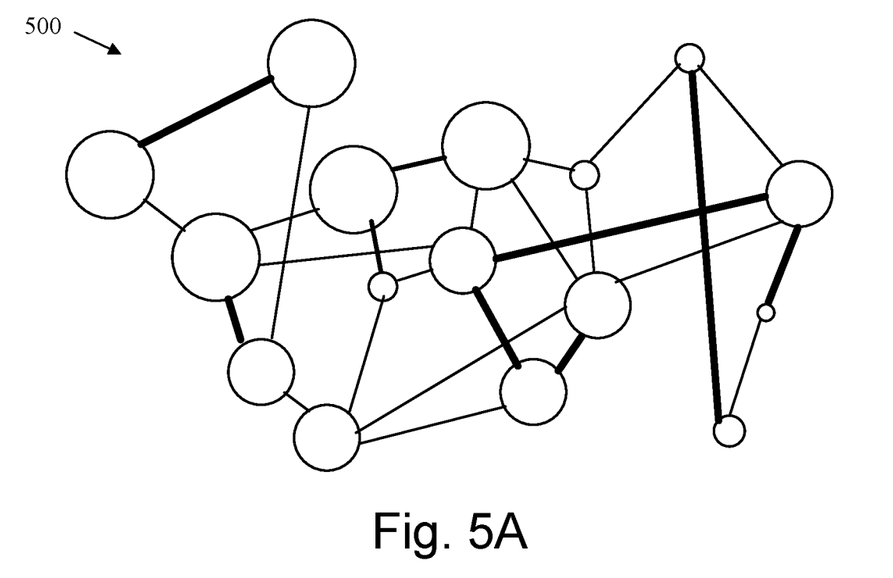
FIG. 5A is a complex weighted graph of nodes that reflect the hierarchy of concepts contained in a video segment regarding risk management, with weighted various predetermined topics within the graph.

FIG. 5A is a complex weighted graph of nodes 500 that reflect the hierarchy of concepts contained in a video segment regarding risk management, with weighted various predetermined topics within the graph. Here, the graph can be seen as representing a "concept" or "topic" map, with the side of the nodes proportional to the time spent on each predetermined concept. The links are the transition between topics, and as embodied here, the thickness of the link proportional to the transition frequency between concepts. One can note that large varieties of potential topics that can be referenced within the video segment, with some topics unaddressed. Here, "alpha investment" was a topic not addressed in the risk management video.

The weighted graph 500 can include noise filtering to better define the relevant topics. For example, concept or topic occurrences can be used, e.g., filter out topics that occur less than 5 times within the video segment. Another example of a filter is discussion time, e.g., the topic was never discussed more than 1 minute. Another example is the similarity relevance to neighboring concepts, e.g., probability and finance are weighted more heavily. Once the noise filtering is applied, a smaller and more precise and informative weighted graph such as that embodied in FIG. 5B can be produced.

Figure 5B:
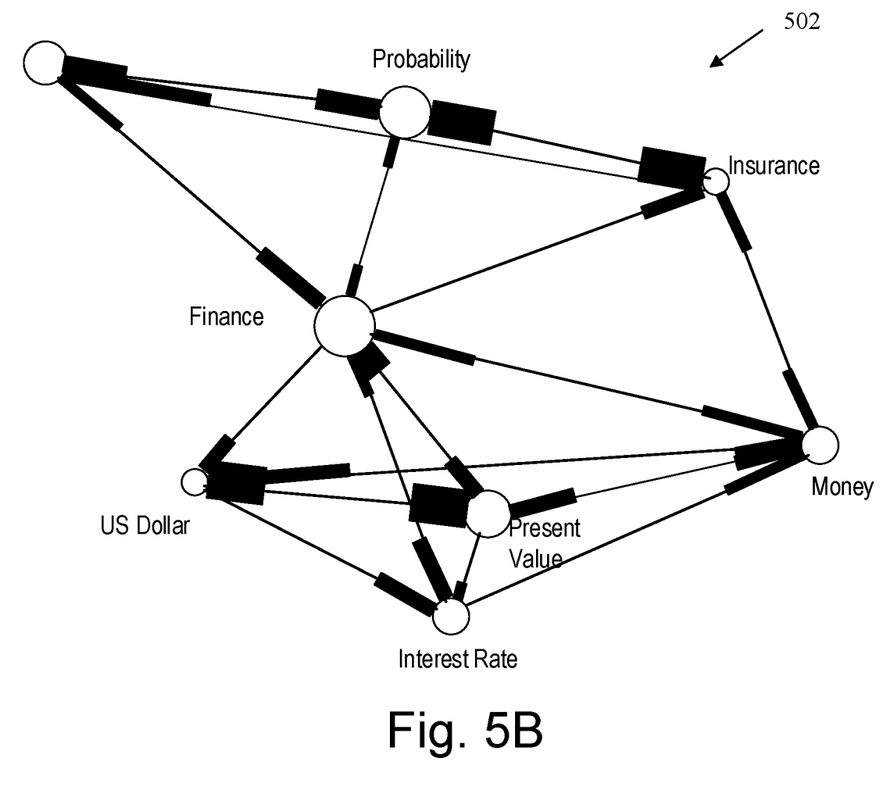
FIG. 5B is a filtered weighted graph of nodes of FIG. 5A.

FIG. 5B is a filtered weighted graph of nodes 502 of FIG. 5A. In this embodiment, topics that occurred less than 15 times in the risk management video segment of FIG. 5A were filtered out. Note that it can be ascertained that, although the stated title of the video segment is about "risk management," the main topics discussed in the video are "probability" and "present values." The directed edges indicate the flow of concepts, e.g., from Finance to Insurance, and back and forth between Insurance and Probability, but without a direct transition between Present Values and Probability. This approach of noise filtering can therefore be used to summarize almost any material in a video segment and align it with predetermined topics.

In view of the filtering of the weighted graph 502, the topic mix can be displayed as: Probability (35%), Finance (24%), Present Value (13%), Money (16%), Interest Rate (8%), Insurance (4%). The amount of depth of the number of closely relevant topics can also be stated. Here most topics concern probability: probability theory, probability distribution, independence, expected value. A value for the "breadth" of a topic can also be stated, such weighting the amount of time given a specific topic within the video segment, e.g., the longest discussed topics concerned probability: statistics, gambling, risk, and present value.

Other aspects within the graph 502 can also modify the weighting, such as the topic development pattern, e.g., topic relationships such as the general probability followed by the specific gambling. Furthermore, the use of specific examples of topics can likewise alter the weighting, be they an experiment, e.g., coin-flipping, or "real world" examples, e.g., insurance, annuity, mortgage loan, asset. Other potential aspects can include the level the video segment is taught at, e.g., analyze the depth and the breadth of the vocabulary used, or the overall tone and nature of the language use, e.g., active or passive language, or the use of declarative or assertive statements.

Figure 6:
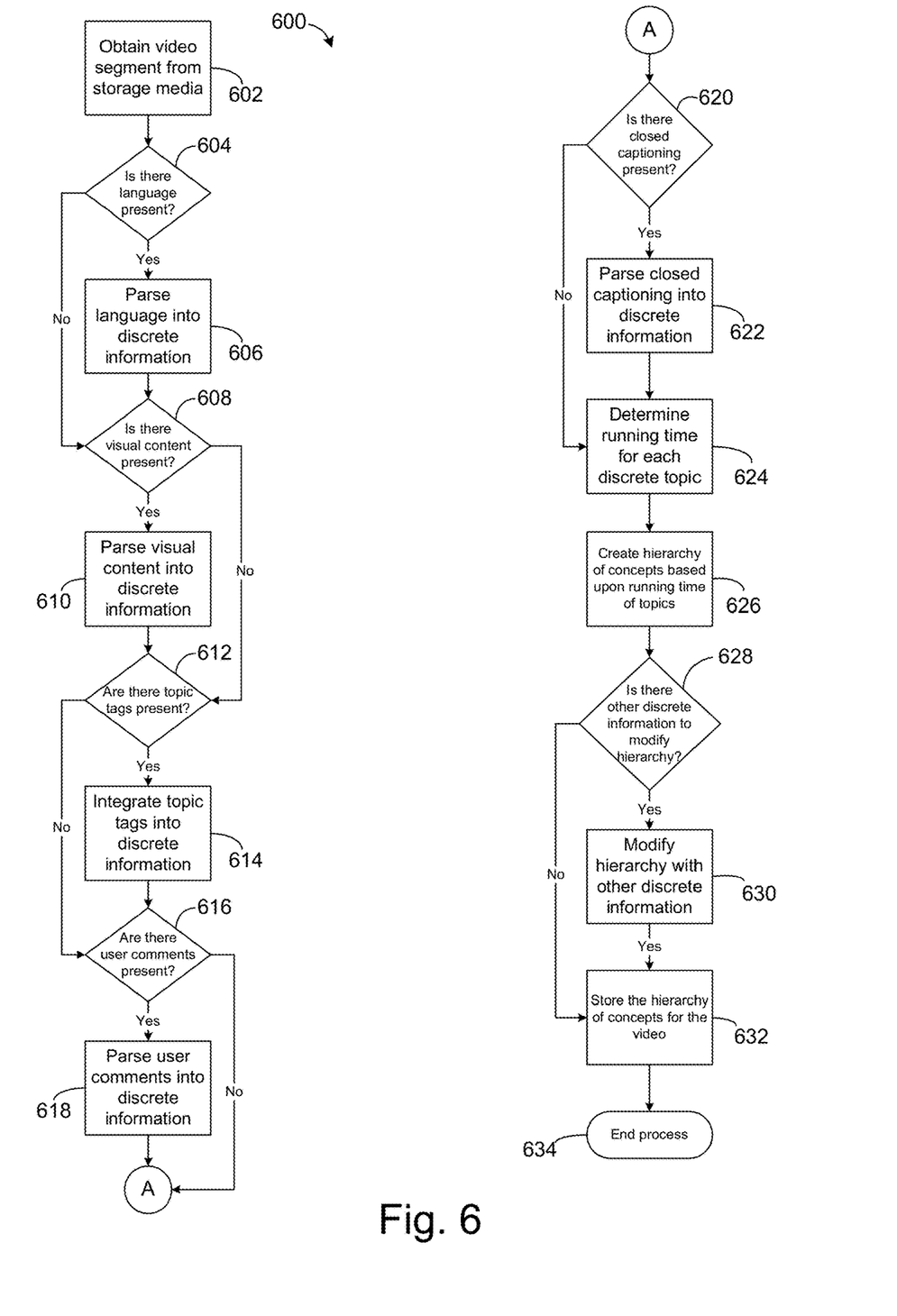
FIG. 6 is a flowchart of one embodiment of a process to parse out discrete information from the video segment and data contained therein and therewith to create a hierarchy of concepts, such as the weighted graphs of FIGS. 4, 5A and 5B.

FIG. 6 is flowchart of one embodiment of a process 600 to parse out discrete information from the video segment 300 and data contained therein and therewith to create a hierarchy of concepts, such as the weighted graphs of FIGS. 4, 5A, and 5B. The process 600 commences with the video segment 300 being obtained from a computer storage media, as shown at step 602. The retrieval step can occur, for example, at computer device 200, accessing the video streaming 216 application. Then a determination is made as to whether there is language present within the video segment 300 that can be parsed out into discrete information, as shown at decision 604. If there is language present, the language is parsed into discrete information as shown at step 606. Thus, other programs can be used by the computer device 200 to gather data from the natural language data.

Once the language is parsed at step 606, or of there was no language present at step 606, then a determination is made as to whether there is visual content present in the video segment 300, as shown at decision 608. If there is visual content present at decision 608, then the visual content is parsed into discrete information, as shown at step 610. Again, other programs can be utilized by the computer device 200 to parse visual content as would be known to one of skill in the art. For example, image recognition, color recognition, and even face mapping can be used to discern the discrete information contained within the visual content, if present. Otherwise, if there is no visual content present at decision 608, or if the visual content has been parsed at step 610, then a determination is made as to whether there are any topic tags present along with the video segment 300.

The topic tags are created typically by the creator of the video segment 300 to give an idea of what the content of the video segment 300 is, and are sometimes referred to as seed descriptions. They topics tags can be present in the header of the code for the posting of the video segment 300, or in a predetermined section of the video segment 300 in the format it is in. Others than the creator of the video segment 300 can likewise add topic tags to the video segment 300. If topic tags are present at decision 612, then the topic tags are integrated into the discrete information of the hierarchy of concepts, as shown at step 614. This information can thus be used to reweight the nodes of the weighted graph 400 of FIG. 4, or the weighted graphs of FIGS. 5A and 5B. If there are no topic tags present at decision 612, or after integration of the topic tags at step 614, a determination is made as to whether there are user comments present in the video segment 300 and its data, as shown at decision 616.

If the user comments are present at decision 616, then the user comments are parsed into discrete information, as shown at step 618. The user comments typically are written language contained in data that is at least linked to the video segment 300. Thus, the computer device 200 can likewise use the resources it has to parse language from the video segment 300 at step 606 to also parse data from the user comments. If there are no user comments present at decision 616, or once the user comments are parsed into discrete information at step 618, then a determination is made as to whether there is closed captioning data 302 present in the video segment 300, as shown at decision 620.

Decision 620 can be a shortcut to avoid having to parse natural language from the video segment 300 at step 606, but then the computer device 200 is relying that the information included in the closed caption is accurate as to the natural language content. If closed captioning data is present, such closed captioning 302 in video segment 300 of FIG. 3, then the closed captioning data is parsed into discrete information, as shown at step 622. Otherwise, if there is no closed captioning data present at decision 620, or once present closed captioning data is parsed at step 622, then the running time for each discrete topic is determined, as shown by step 624.

At step 624, the discrete topics can be created for the hierarchy of concepts or predetermined topics can be populated with the discrete data. The running time for each discrete topic, as determined at step 624, should the greatest factor determinative of the nature of the video segment 300. However, this attribute can be omitted from the hierarchy of concepts as a focus, or weighted node, but then it will make adequate searching more difficult as it tends to be a salient attribute of content. Once the running time is determined at step 626, then the hierarchy of all concepts can be created as shown at step 626, with the primacy of the running time (duration of subject matter content 402) most heavily weighted in the hierarchy.

Once the hierarchy of concepts is created, such as with weighted graph 400 in FIG. 4, then a determination can be made as to whether there is other discrete information to modify the hierarchy, as shown at decision 628. This step and is not necessary, but it done alternately to allow a reweighting of the hierarchy of concepts, such as reweighting the weighted graph 400, to emphasize other nodes or concepts within the hierarchy, for whatever reason desired. In such reweighting, the duration of the subject matter content 402 can be deemphasized and other attributes, such as management style 404 made prominent. For example, if the user comments stated that a video segment 300 doesn't give enough examples of what it discussed, then the number of examples 410 can be weighted lower such that a searcher looking of specific examples of concepts is less likely to get an affirmative match with this hierarchy of concepts.

If there is no discrete information present to otherwise modify the hierarchy of concepts at decision 628, or after modifying the hierarchy of concepts, then the hierarchy of concepts is stored as shown by step 632 and the process ends as shown by termination 634. Thus, if a weighted graph 400 was created, it can be stored locally at the computer device 200 at stored hierarchies 218, or remotely such as at database 118. The storage of the hierarchies allows a powerful searching tool to be created which can better search for content and other attributes within video segments that can give better semantic search results, which is particularly advantageous in searching for learning materials that need a high degree of granularity in searching of concepts to best match the interests of the searcher.

It should further be appreciated that the number of weight nodes of the weight graph 400 that can be created and used are not limited, and the number can be dynamically changed in periodic intervals or on events happening, such as if new user comments are posted or new topic tags added. Furthermore, although a weighted graph 400 is being shown in the embodiment of FIGS. 4, 5A and 5B, other storage structures of data can likewise be used to store the hierarchy of concepts, such as linked lists, tables, spreadsheets, maps, or other SQL or common structures.

Detailed embodiments of the claimed structures and methods are disclosed herein; however, it can be understood that the disclosed embodiments are merely illustrative of the claimed structures and methods that may be embodied in various forms. The present disclosure may, however, be embodied in many different forms and should not be construed as limited to the exemplary embodiments set forth herein. Rather, these exemplary embodiments are provided so that this disclosure will be thorough and complete and will fully convey the scope of the present disclosure to those skilled in the art. In the description, details of well-known features and techniques may be omitted to avoid unnecessarily obscuring the presented embodiments.

What is claimed is:

1. A computer implemented method of automatically generating a hierarchy of concepts described in a video using semantic concept matching, comprising:
   obtaining a video segment having a distinct running time, and including information related to one or more topics based on at least one of (i) closed captioning data, (ii) spoken language in the video, and (iii) visual content in the video;
   upon determining that there is closed captioning data, parsing the information of the video segment into discrete information based on the closed captioning data;
   upon determining that there is no closed captioning data:
      parsing the information of the video segment into discrete information based on at least one of (i) the spoken language in the video, which is converted to text by the computer, and (ii) the visual content in the video, which is recognized by the computer; and
      upon determining that there is no visual content in the video, obtaining one or more topic tags of the video segment;
   relating the discrete information to a predetermined relevant topic;
   determining one or more attributes for weighting each of the discrete information related to the predetermined relevant topic within the video segment;
   creating a hierarchy of concepts of the video segment based upon, at least, the weighting of each of the discrete information related to the predetermined relevant topic within the video segment based upon the presence of the one or more attributes;
   filtering out topics that occur less than a predetermined number of times within the video segment;
   creating a weighted graph, wherein each concept of the hierarchy of concepts is a weighted node within the graph; and
   storing the weighted graph for the video segment in a searchable database to provide a granular search tool of the video.

2. The method of claim 1, further comprising:
   integrating the topic tags within the hierarchy of concepts.

3. The method of claim 1, wherein the video segment further includes related data of user comments related to the video segment, the user comments including discrete information, and further comprising:
   parsing the user comments into the discrete information;
   relating the discrete information to a predetermined relevant topic; and
   modifying the hierarchy of concepts of the video segment based upon the discrete information of the relevant topic of the user comments.

4. The method of claim 1, wherein the information of the video segment includes natural language, and further comprising parsing the natural language from the video segment, wherein the discrete information is created by analyzing the parsed natural language.

5. The method of claim 1, wherein the information of the video segment includes visual content, and further comprising parsing the visual content from the video segment, wherein the discrete information is created by analyzing the parsed visual content.

6. The method of claim 1, wherein the one or more attributes for weighting each discrete information relevant topic are one or more of: the duration of the relevant topic within the video segment, the breadth of the relevant topic, the relatedness of the relevant topic to other relevant topics within the video segment, and the developmental pattern of the relevant topic within the video segment.

7. The method of claim 1, further comprising, upon determining that there is additional discrete information, reweighting the hierarchy of concepts.

8. A computer system for automatically generating a hierarchy of concepts described in a video using semantic concept matching, the computer system comprising:
   a processor, a computer-readable memory, a computer-readable tangible storage device, and program instructions stored on at least one or more storage devices for execution by at least one or more processors via at least one or more memories, wherein the computer system is configured to:
   obtain a video segment having a distinct running time, and including information related to one or more topics based on at least one of (i) closed captioning data, (ii) spoken language in the video, and (iii) visual content in the video;
   upon determining that there is closed captioning data, parse the information of the video segment into discrete information based on the closed captioning data;
   upon determining that there is no closed captioning data:
      parse the information of the video segment based on at least one of (i) the spoken language in the video, which is converted to text by the computer, and (ii) visual content in the video, which is recognized by the computer; and
      upon determining that there is no visual content in the video, obtain one or more topic tags of the video segment;
   relate the discrete information to a predetermined relevant topic;

determine one or more attributes for weighting each of the discrete information related to the predetermined relevant topic within the video segment;

create a hierarchy of concepts of the video segment based upon, at least, the weighting of each of the discrete information related to the predetermined relevant topic within the running time of the video segment based upon the presence of the one or more attributes;

filter out topics that occur less than a predetermined number of times within the video segment;

create a weighted graph, wherein each concept of the hierarchy of concepts is a weighted node within the graph; and store the weighted graph for the video segment in a searchable database to provide a granular search tool of the video.

9. The system of claim 8, wherein the computer system is further configured to:

integrate the topic tags within the hierarchy of concepts.

10. The system of claim 8, wherein the video segment further includes related data of user comments related to the video segment, the user comments including discrete information, and the computer system is further configured to:

parse the user comments into the discrete information;

relate the discrete information to a predetermined relevant topic; and modify the hierarchy of concepts of the video segment based upon the discrete information of the relevant topic of the user comments.

11. The system of claim 8, wherein the information of the video segment includes natural language, and the computer system is further configured to parse the natural language from the video segment, wherein the discrete information is created by analyzing the parsed natural language.

12. The system of claim 8, wherein the information of the video segment includes visual content, and the computer system is further configured to parse the visual content from the video segment, wherein the discrete information is created by analyzing the parsed visual content.

13. The system of claim 8, further configured to determine, as one or more attributes, one or more of: the duration of the relevant topic within the video segment, the breadth of the relevant topic, the relatedness of the relevant topic to other relevant topics within the video segment, and the developmental pattern of the relevant topic within the video segment.

14. The system of claim 8, further configured to determine, upon determining that there is additional discrete information, reweighting the hierarchy of concepts.

15. A computer program product stored on a non-transitory computer readable medium having computer readable program code embodied thereon that is executable by a computer for automatically generating a hierarchy of concepts described in a video using semantic concept matching, the computer program product comprising computer readable program code that when executed configures a computer to perform the acts of:

obtaining a video segment having a distinct running time, and including information related to one or more topics based on at least one of (i) closed captioning data, (ii) spoken language in the video, and (iii) visual content in the video;

upon determining that there is closed captioning data, parsing the information of the video segment into discrete information based on the closed captioning data;

upon determining that there is no closed captioning data:

parsing the information of the video segment based on at least one of (i) the spoken language in the video, which is converted to text by the computer, and (ii) the visual content in the video, which is recognized by the computer; and upon determining that there is no visual content in the video, obtaining one or more topic tags of the video segment;

relating the discrete information to a predetermined relevant topic;

determining one or more attributes for weighting each of the discrete information related to the predetermined relevant topic within the video segment;

creating a hierarchy of concepts of the video segment based upon, at least, the weighting of each of the discrete information related to the predetermined relevant topic within the video segment based upon the presence of the one or more attributes;

filtering out topics that occur less than a predetermined number of times within the video segment;

creating a weighted graph, wherein each concept of the hierarchy of concepts is a weighted node within the graph; and storing the weighted graph for the video segment in a searchable database to provide a granular search tool of the video.

16. The computer program product of claim 15, wherein execution of the code further configures the computer to perform acts comprising:

integrating the topic tags within the hierarchy of concepts.

17. The computer program product of claim 15, wherein the video segment further includes related data of user comments related to the video segment, the user comments including discrete information, and wherein execution of the code further configures the computer to perform acts comprising:

parsing the user comments into the discrete information;

relating the discrete information to a predetermined relevant topic; and modifying the hierarchy of concepts of the video segment based upon the discrete information of the relevant topic of the user comments.

18. The computer program product of claim 15, wherein the information of the video segment includes natural language, and wherein execution of the code further configures the computer to perform acts comprising parsing the natural language from the video segment, wherein the discrete information is created by analyzing the parsed natural language.

19. The computer program product of claim 15, wherein the information of the video segment includes visual content, and wherein execution of the code further configures the computer to perform acts comprising parsing the visual content from the video segment, wherein the discrete information is created by analyzing the parsed visual content.

20. The computer program product of claim 15, wherein execution of the code further configures the computer to perform acts comprising: upon determining that there is additional discrete information, reweighting the hierarchy of concepts.

* * * * *